United States Patent [19]

Nogiwa et al.

[11] Patent Number: 4,483,553
[45] Date of Patent: Nov. 20, 1984

[54] PASSIVE SEAT BELT FOR AN AUTOMOBILE

[75] Inventors: Masashi Nogiwa, Hatano; Yasunao Miyata, Hiratsuka; Tsuyoshi Maeda, Hiratsuka; Hajime Kumada, Hiratsuka; Yoshitaka Suzuki, Odawara, all of Japan

[73] Assignee: Nissan Shatai Co., Ltd., Japan

[21] Appl. No.: 445,226

[22] Filed: Nov. 29, 1982

[51] Int. Cl.³ .................................................. B60R 21/10
[52] U.S. Cl. ..................................... 280/803; 280/804; 297/469; 297/483
[58] Field of Search ............... 280/801, 802, 803, 804, 280/733; 180/268, 269; 297/468, 469, 479, 480, 483

[56] References Cited

U.S. PATENT DOCUMENTS

| | | | |
|---|---|---|---|
| 4,264,089 | 4/1981 | Maekawa et al. | 280/803 |
| 4,286,804 | 9/1981 | Maekawa et al. | 280/803 |
| 4,296,943 | 10/1981 | Takada | 280/804 |
| 4,296,944 | 10/1981 | Matsuoka et al. | 280/804 |
| 4,336,957 | 6/1982 | Schultz et al. | 280/803 |
| 4,354,695 | 10/1982 | Sato | 280/804 |
| 4,387,912 | 6/1983 | Moriya et al. | 280/804 |

FOREIGN PATENT DOCUMENTS

| | | | |
|---|---|---|---|
| 2738439 | 3/1979 | Fed. Rep. of Germany | 280/801 |
| 151451 | 9/1982 | Japan | 280/802 |

*Primary Examiner*—Joseph F. Peters, Jr.
*Assistant Examiner*—Mitchell J. Hill
*Attorney, Agent, or Firm*—Ostrolenk, Faber, Gerb & Soffen

[57] ABSTRACT

A passive seat belt for an automobile is disclosed. A guide rail is mounted to a sashless door or a roof side rail, and a movable anchor member is adapted to move in the groove of the guide rail so that the one end of a belt, connected to the free end of the movable anchor member, may be kept at a certain height higher than the door panel for preventing the belt from contacting a part of a body of a driver or a passenger. The guide rail may be straight and positioned horizontally or may be bent at the rear end of the door. The movable anchor member may be locked by a locking stop. The guide rail is covered by a decorative trim piece. The movable anchor member is reinforced by a reinforcing member mounted to the door, the pillar, or the like of the automobile.

18 Claims, 26 Drawing Figures

PASSIVE SEAT BELT FOR AN AUTOMOBILE

BACKGROUND OF THE INVENTION

The present invention relates to a passive seat belt for an automobile.

Figure 1:
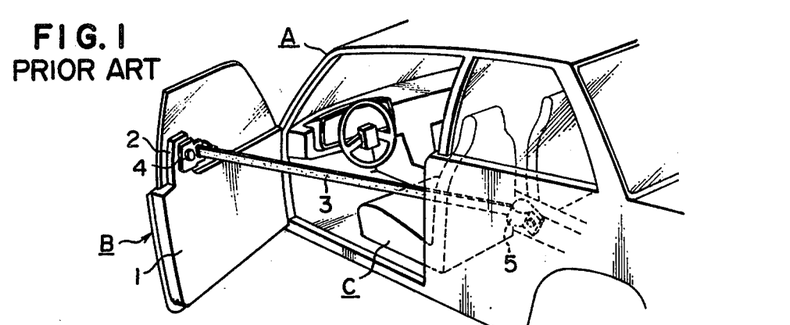
FIG. 1 is a perspective view of an automobile having a conventional passive seat belt.

In an automobile A having a sashless door B and a seat C, as shown in FIG. 1, a conventional passive seat belt 3 is anchored to a pole 2 which extends upwards from the rear top of an inner panel 1 of the door B, by an anchor 4 in its one end, and the other end of the passive seat belt 3 is rolled up on a retractor 5 which is disposed to a floor beside the seat C on the side opposite the door B.

In this embodiment, when the door B is opened, the belt 3 is moved frontward slightly. Hence, when a driver or a passenger gets into or out of the automobile, his breast or knee is contacted with or rubbed by the belt 3, which limits his motion and imparts an uncomfortable feeling. Further, since the frontward movement of the belt 3 depends on an opening angle of the door, in a narrow space where the door cannot be opened fully, the situation is worse.

Figure 2:
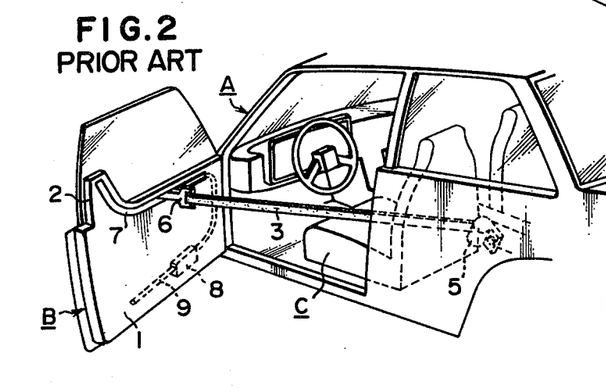
FIG. 2 is a perspective view of an automobile having another conventional passive seat belt.

In order to remove such defects and inconveniences of the conventional passive seat belt described above, another passive seat belt has been proposed, as shown in FIG. 2. In this embodiment, the inner panel 1 is provided with the pole 2 in the same manner as described above, and a guide rail 7 running frontwards along the upper end of the inner panel 1 from the top of the pole 2. A movable anchor 6 which is connected to one end of the passive seat belt 3, is adapted to move frontwards along and in the guide rail 7 by means of a drive motor 8 arranged in the inner panel 1, and a geared wire 9 whose one end is connected to the movable anchor 6.

In this embodiment, when the one end of the passive seat belt 3 is moved frontwards along the guide rail 7, the belt 3 still contacts or rubs the femoral region or the knee of the driver or the passenger getting into or out of the automobile. Further, since the belt 3 is positioned in rather low position as compared with the pole 2 when it is positioned in the front end of the inner panel 1, when the belt 3 is put on, the belt 3 is apt to be fitted under the arm instead of the shoulder of the driver depending on his position.

Some means for locking the movable anchor 6 moving along the guide rail 7 at the fitting position of the belt 3 have been proposed.

In one example of the conventional locking means, a switch is turned on or off by opening or closing the door, and a solenoid valve is actuated by the switch. A locking pin or hook is connected to the solenoid valve. When the belt is put on, the anchor moving along the guide rail pushes the locking pin or hook, and as soon as the anchor passes through the locking pin or hook, the anchor is locked thereby. When the belt is released, the solenoid valve is actuated by the opening of the door to unlock the anchor by retracting the locking pin or hook which is actuated by the solenoid valve.

In this embodiment, the solenoid valve, the door switch, and so forth are necessary, and the locking means becomes complicated and large-sized, which means high cost and requires more space for mounting.

In another example of the conventional locking means, a locking pin is adapted to project into the guide rail so as to lock the anchor which is connected to and driven by the geared wire, and a little space is left between the anchor and the geared wire. An unlocking mechanism is provided between the locking pin and the geared wire as well as the anchor, and releases the locking between the locking pin and the anchor by the first motion of the geared wire prior to the start of the moving of the anchor.

In still another example of the conventional locking means, opening and closing movements of the door are transferred to a locking pin which projects into the guide rail, and the locking between the anchor and the appearance pin is released prior to the start of the moving of the anchor.

In these two embodiments described above, the locking means are complicated, and a small space is necessarily left between the anchor and the geared wire in order to ensure a short time before the start of the moving of the anchor. Further, a strict adjustment is required, such that the locking between the anchor and the locking pin may be released as soon as the door is opened.

Figure 3:
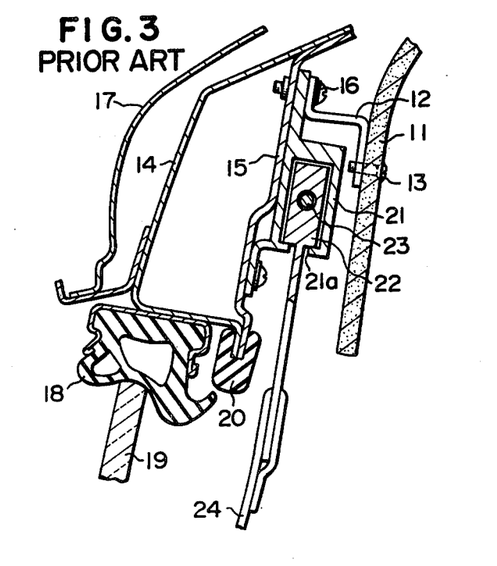
FIG. 3 is a longitudinal cross section of the essential part of a conventional passive seat belt.

Meanwhile, as shown in FIG. 3, in a conventional passive seat belt, a trim member 11 is mounted to roof side rails such as outer and inner roof side rails 14 and 15 via a bracket 12 and screw bolts 13 and 16 in order to cover the guide rail 21 in which an anchor 22 is moved by a geared wire 23. The roof side rails 14 and 15 are covered by a roof panel 17, and between the roof side rails 14 and 15 and a door glass 19, a weather strip 18 is arranged in order to stop water or the like from coming in. A welt 20 is attached to the lower end of the inner roof side rail 15. The free end of the anchor 23 is connected to a shoulder belt 24 which is rolled up by a retractor 25 positioned on a floor beside a seat on the side opposite the door.

In this embodiment, however, the mounting parts are exposed to the inside of the compartment of the automobile, resulting in spoiling the appearence thereof. Then, it is intended to cover the mounting parts by a decorative trim member or the like, but the simple covering by the trim members results in its projection into the compartment of the automobile, which a disadvantage and inconvenience. Further, the opening 21a of the guide rail 21 which the anchor 23 is moved in and along, is open, and hence dust and trash, and so forth are apt to come in the guide rail 21. When the opening 21a of the guide rail 21 opens upward, this tendency becomes larger.

Figure 4:
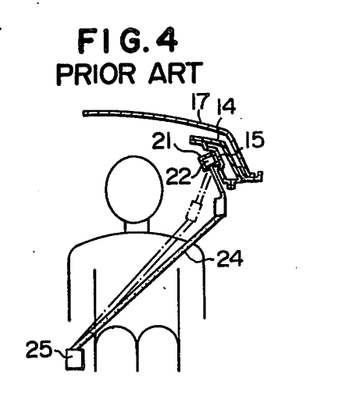
FIG. 4 is a schematic view of a further conventional passive seat belt.
Figure 5:
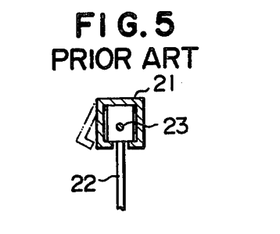
FIG. 5 is an enlarged cross sectional view of the essential part of FIG. 4.

Further, in a conventional passive seat belt, as shown in FIGS. 4 and 5, the belt 24 which is extended from the retractor 25 is moved along the guide rail 21 through the movable anchor 22, the guide rail 21 being mounted to the inner roof side rail 15. When a large load is placed on the anchor 22, while the belt 21 is put on, the anchor 22 is often bent in the sideway direction, or the side of the guide rail 21 is often bent outwards to open the opening 21a thereof, as shown by dotted lines in FIGS. 4 and 5. When the thickness of the anchor 22 is increased in order to prevent easy bending, its weight increases, its processing becomes difficult, and it requires a larger space. Further, since the anchor is so formed as to conform to the curved surface of the door or the roof side rail in order to obtain a wider space for the compartment, the shape of the anchor is readily changed when the large load is placed thereon.

Figure 6:
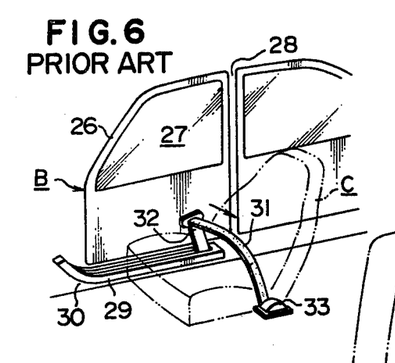
FIG. 6 is a perspective view of a still another conventional passive seat beat.
Figure 7:
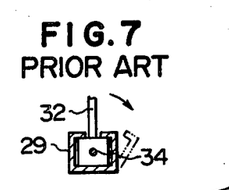
FIG. 7 is an enlarged cross sectional view of the essential part of FIG. 6.

In FIGS. 6 and 7, another embodiment of the conventional passive seat belt is shown, wherein a door B having a door sash 26 and a door glass 27, is pivotally mounted to a pillar 28, and a seat C is provided. A guide rail 29 is mounted to a side sill 30, and one end of a wrap belt 31 is connected to a movable anchor 32 and the other end of the wrap belt 31 is rolled up by a retractor 33. The movable anchor 32 is moved along and in the guide rail 29 by a geared wire 34. In this embodiment, the problems similar to those of the above described embodiment are raised.

SUMMARY OF THE INVENTION

It is an object of the present invention to provide a passive seat belt for an automobile, free from the aforementioned disadvantages and inconveniences, which permits getting into or out of the automobile with a comfortable feeling, without contacting or rubbing the belt.

According to the present invention there is provided a passive seat belt for an automobile, whose one end is mounted to a door and whose other end is rolled up by a retractor mounted to a floor beside a seat on the side opposite of the door. The invention comprises (a) a guide rail which is mounted horizontally to the upper end of a door panel, (b) a movable vertical member having a certain height, which is movable upright along the guide rail, (c) drive means arranged in the door panel, which drives the movable vertical member along the guide rail, and (d) a belt which is adapted to be rolled up by the retractor, and one end of which is detachably mounted to the top portion of the movable vertical member.

According to the present invention there is also provided a passive seat belt for an automobile, whose one end is mounted to a door and whose other end is rolled up by a retractor mounted to a floor beside a seat on the side opposite the door. The invention comprises (a) a vertical member having a certain height, which is mounted upright to the rear top end of a door panel, (b) a guide rail having a groove, which is mounted to the door panel along the vertical member and the upper end of the door panel, the groove opening frontwards in the part along the vertical member and upwards in the part along the upper end of the door panel, (c) a movable anchor having a certain length, which is movable along the groove of the guide rail and which extends frontwards in the part along the vertical member and upwards in the part along the upper end of the door panel, (d) drive means arranged in the door panel, which drives the movable anchor along the guide rail, and (e) a belt which is adapted to be rolled up by the retractor, and one end of which is detachably mounted to the free end of the movable anchor.

Other objects, features and advantages of the present invention will become clear from the following description and the appended claims, taken in conjunction with the accompanying drawings.

DESCRIPTION OF THE PREFERRED EMBODIMENTS

Referring to the drawings there is shown in FIGS. 8-14 the first embodiment of a passive seat belt for an automobile according to the present invention.

Figure 8:
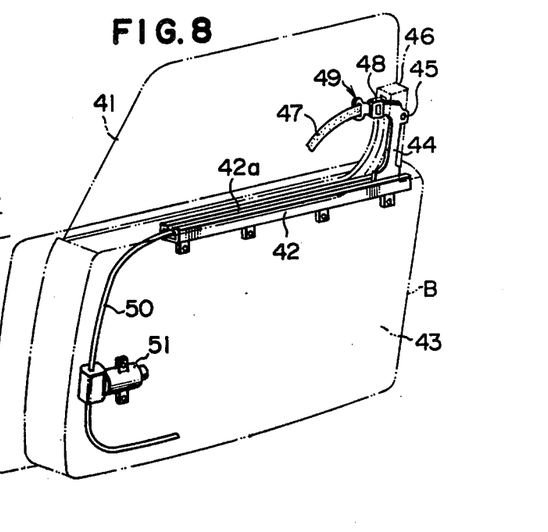
FIG. 8 is a perspective view of a passive seat belt for an automobile, mounted to a door, according to the present invention.
Figures 9, 10:
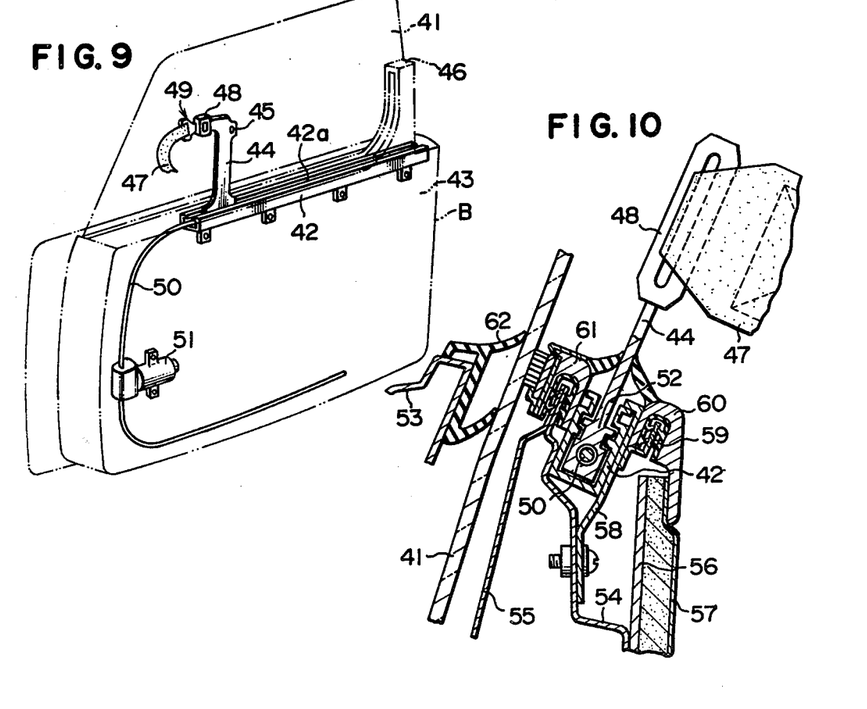
FIG. 9 is a perspective view of the passive seat belt of FIG. 8, in which a movable anchor is positioned in the front part of the door.
FIG. 10 is an enlarged longitudinal cross section of the essential part of the passive seat belt shown in FIG. 9.

In a sashless door B having a door glass 41, a guide rail 42 having a groove 42a open upwards is mounted horizontally to the upper end of a door panel 43. A movable pole 44 having a locking hole 45 in its upper rear end stands upright on the guide rail 42 and is moved along the guide rail 42 by a motor 51 mounted to the door panel 43 via a geared wire 50 whose one end is connected to the foot of the movable pole 44. The motor 51 is actuated by a door switch (not shown) which is actuated by the opening and the closing of the door.

Figure 11:
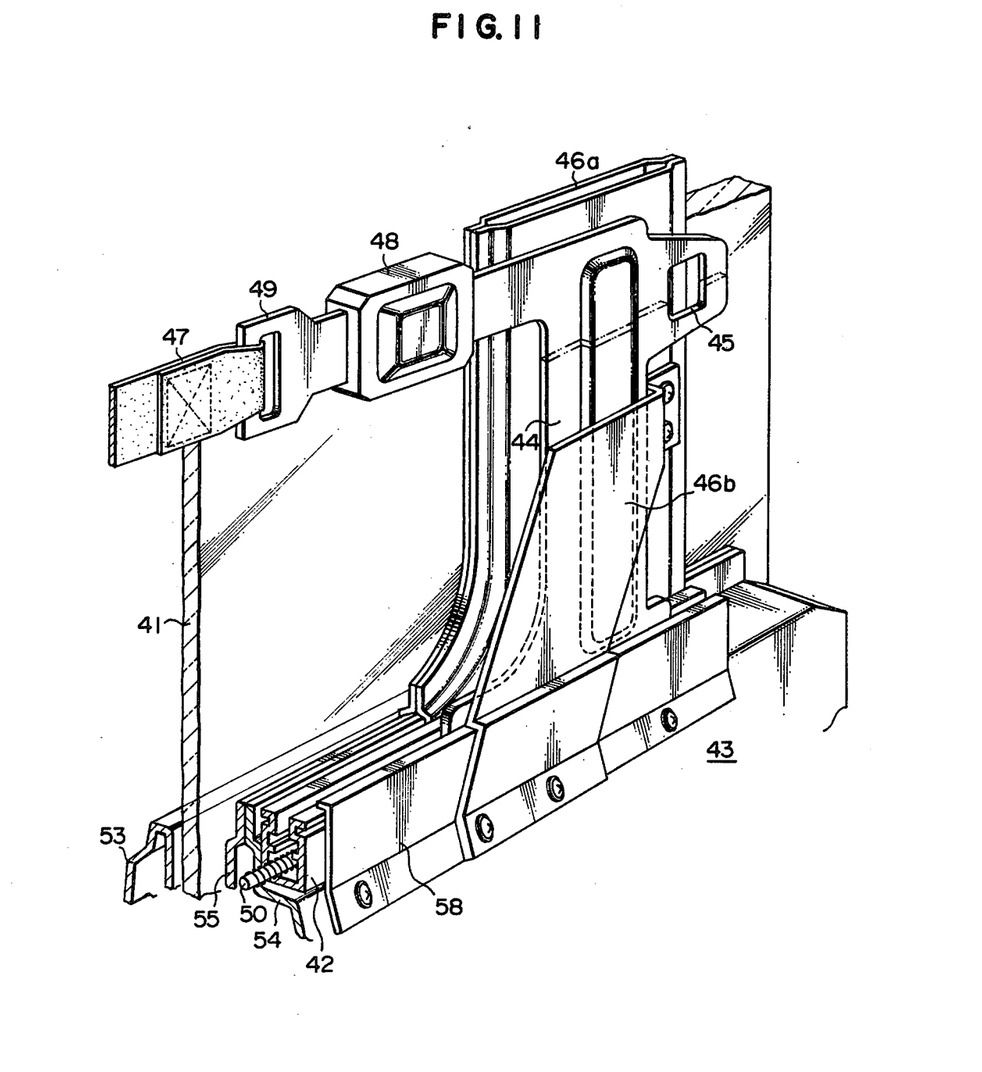
FIG. 11 is an enlarged perspective view of a tower part of FIG. 8.

A tower 46 comprising an outer member 46a and an inner member 46b is mounted upright on the upper rear end of the guide rail 42, and is adapted to receive the movable pole 44. One end of a belt 47 is connected to the top front end of the pole 44 via an emergency buckle 48 and a belt anchor 49 connected to the belt 47. A runner 52 positioned in the bottom of the pole 44 is slidably moved in and along the groove 42a of the guide rail 42.

The door B comprises a door outer panel 53, a door inner panel 54, and a reinforcing panel 55 positioned outside of the door inner panel 54, and the latter two panels are connected to each other in their upper ends. On the inner surface of the door inner panel 54, an inner board 56 is mounted, and the inner surface of the inner board 56 is covered by a surface cover 57.

The guide rail 42 is mounted to the door inner panel 54 by using a mounting panel 58. A bracket 59 is mounted to the upper part of the mounting panel 58. A decorative trim piece 60 is fitted on the free end of the bracket 59 in order to cover the upper end of the inner board 56 and the surface cover 57 attached thereto. The trim piece 60 is provided with a fillet for covering the inside opening between the guide rail 42 and the movable pole 44. A welt 61 having a fillet and bristles in its inner and outer ends is put on the connected upper ends of the door inner panel 54 and the reinforcing panel 55 for covering the outside opening between the guide rail 42 and the movable pole 44 and the space between the door window glass 41 and the reinforcing panel 55. A weather strip 62 having fillets is attached to the upper end of the door outer panel 53 for covering the space between the door window glass 41 and the door outer panel 53.

Figure 12:
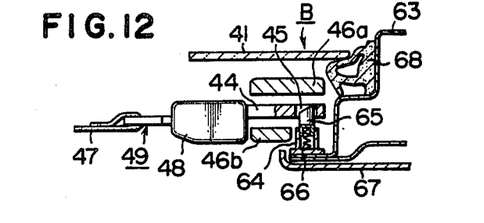
FIGS. 12, 13 and 14 are enlarged transverse cross sections for explaining a locking mechanism of locking means of the passive seat belt of FIG. 8.

As shown in FIG. 12, on a pillar 63 of the body of the automobile, a cylindrical member 64 is horizontally mounted near the inner member 46b of the tower 46, and a locking pin 65 having a tapered free end 65a is fitted partly in the cylindrical member 64 so as to be biased outwards by a coil spring 66 inserted in the cylindrical member 64. The inner surface of the pillar 63 is covered by a surface cover 67, and a weather strip 68 is attached to the outer corner portion of the pillar 63. The rear end of the door window glass 41 is adapted to contact with the weather strip 68 when the door B is closed.

When the door B is closed, as shown in FIG. 12, the locking pin 65 is inserted in the locking hole 45 of the movable pole 44, thereby preventing the movable pole 44 from moving frontwards. In this state, the movable pole 44 can be moved in the direction of the door's opening and closing freely.

Figure 13:
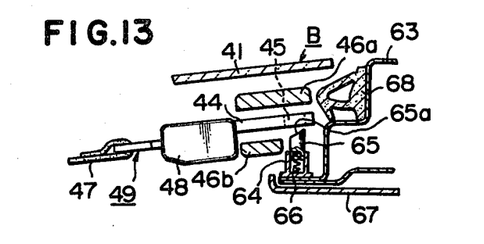

When the door B is opened, as shown in FIG. 13, the engagement of the locking pin 65 with the locking hole 45 of the movable pole 44 is released, and the movable pole 44 can be moved frontwards by driving the motor 51, while the height of the one end of the belt 47 connected to the top portion of the movable pole 44 is kept to the predetermined level.

A delay circuit is preferably added in a drive circuit (not shown) for the motor 51 or a switch is preferably provided to the locking means side so that the movable pole 44 may start to move after the movable pole 44 and the locking pin 65 are completely unlocked.

Figures 14, 15:
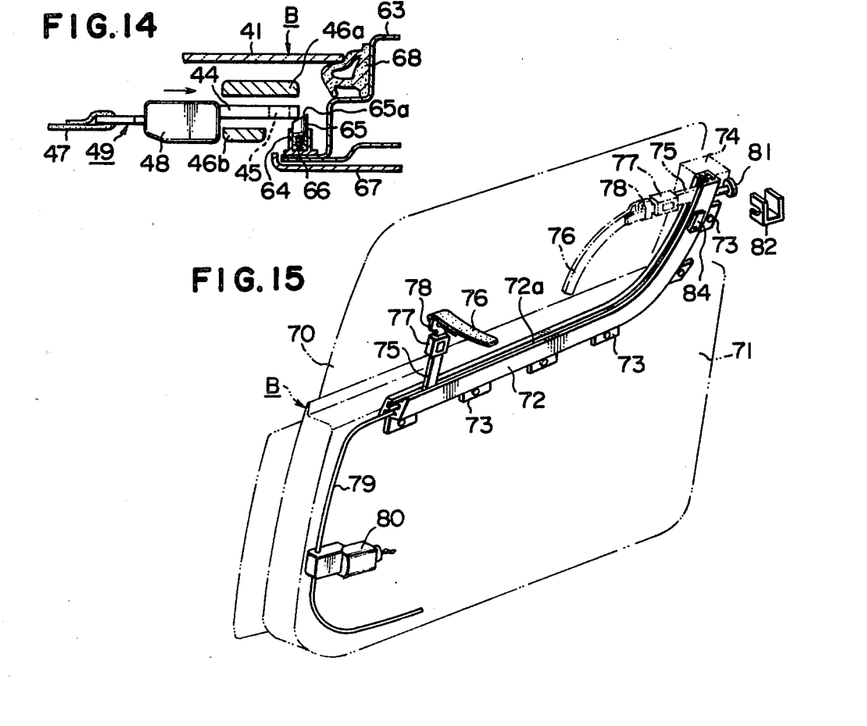
FIG. 15 is a perspective view of another passive seat belt for an automobile, mounted to a door, according to the present invention.

Then, as shown in FIG. 14, when the door B is closed, the movable pole 44 is moved rearwards, and the rear end of the movable pole 44 pushes the tapered free end 65a of the locking pin 65 against the biasing force of the coil spring 66. Then, as the locking pin 65 is pushed, it is retracted into the cylindrical member 64 while the movable pole 44 is moved rearwards. When the movable pole 44 reaches the predetermined rear end of the guide rail 42, i.e. the put-on position of the belt 47, the tapered free end 65a of the locking pin 65 projects into the locking hole 45 of the movable pole 44, as shown in FIG. 12, thereby locking the movable pole 44.

In this embodiment, the movable pole 44 is locked by the locking pin 65 mounted to the pillar 63 of the body of the automobile. Means for locking the movable pole 44 may, however, be mounted alternatively to the door side or both the door and the body sides.

In FIGS. 15-19, there is shown the second embodiment of a passive seat belt for an automobile according to the present invention.

A sashless door B is provided with a door window glass 70 and a door panel 71, in the same manner as the first embodiment of FIGS. 8 and 9. A guide rail 72 having a plurality of mount pieces 73 along its entire length, having a L-shaped form, is mounted to the door panel 71 and a tower 74 which stands upright on the upper rear end portion of the door panel 71. That is, the guide rail 72 runs horizontally along the upper end of the door panel 71, bends in the rear end portion of the door panel 71, and extends upwards along the tower 74. A groove 72a of the guide rail 72 opens upwards along the upper end of the door panel 71 and frontwards along the tower 74.

A movable anchor 75 having a certain length is moved along the groove 72a of the guide rail 71, and it stands upright along the upper end of the guide rail 72 and extends horizontally along the tower 74. The free end of the movable anchor 75 is connected to one end of a belt 76 via an emergency buckle 77 and a belt anchor 78 connected to the one end of the belt 76. The movable anchor 75 is moved along the guide rail 72 by a motor 80 mounted to the door panel 71 via a geared wire 79 whose one end is connected to the foot of the movable anchor 75. The motor 80 is actuated by a door switch (not shown) which is arranged in the door panel 71 and is actuated by the opening and the closing motions of the door B. The motor 80 is also stopped at both ends of the guide rail 72 by using limit switches (not shown) positioned in both the ends of the guide rail 72, which are actuated by contacting by the movable anchor 75.

A locking member 81 having a circular form is attached to the upper rear end portion of the guide rail 72 through the tower 74, and is adapted to engage or disengage with or from a U-shaped receiver 82 mounted to a pillar 93 of the body of the automobile when the door B is closed or opened. Hence, when the belt 76 is pulled strongly in a crash or the like, since the locking member 81 is engaged with the receiver 82, the deformation of the guide rail 72 can be reduced to the minimum extent.

Figure 17:
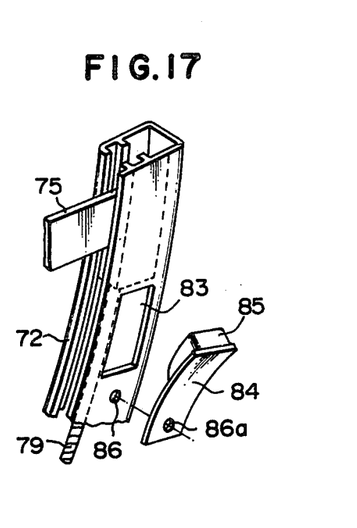
FIG. 17 is an enlarged perspective view of a locking member to be mounted to a guide rail shown in FIG. 15.

The guide rail 72 is provided with a rectangular window 83 in its the inner side of its upper end portion, as clearly shown in FIG. 17. A flexible member 84 made of a spring plate or the like is so mounted as to cover the window 83 at the lower edge portion of the window 83 by a bolt (not shown) passing through holes 86 and 86a formed in the flexible member 84 and the guide rail 72. A stop piece 85 whose thickness is gradually reduced downwards so as to form a tapered surface, is secured to the flexible member 84 so that the stop piece 85 may be inserted into the groove 72a of the guide rail 72 through the window 83 when the flexible member 84 is pushed to the guide rail 72. The free end of the flexible member 84 is normally bent away from the guide rail 72 so that the stop piece 85 mounted thereto may not be projected in the groove 72a of the guide rail 72 through the window 83.

Figure 16:
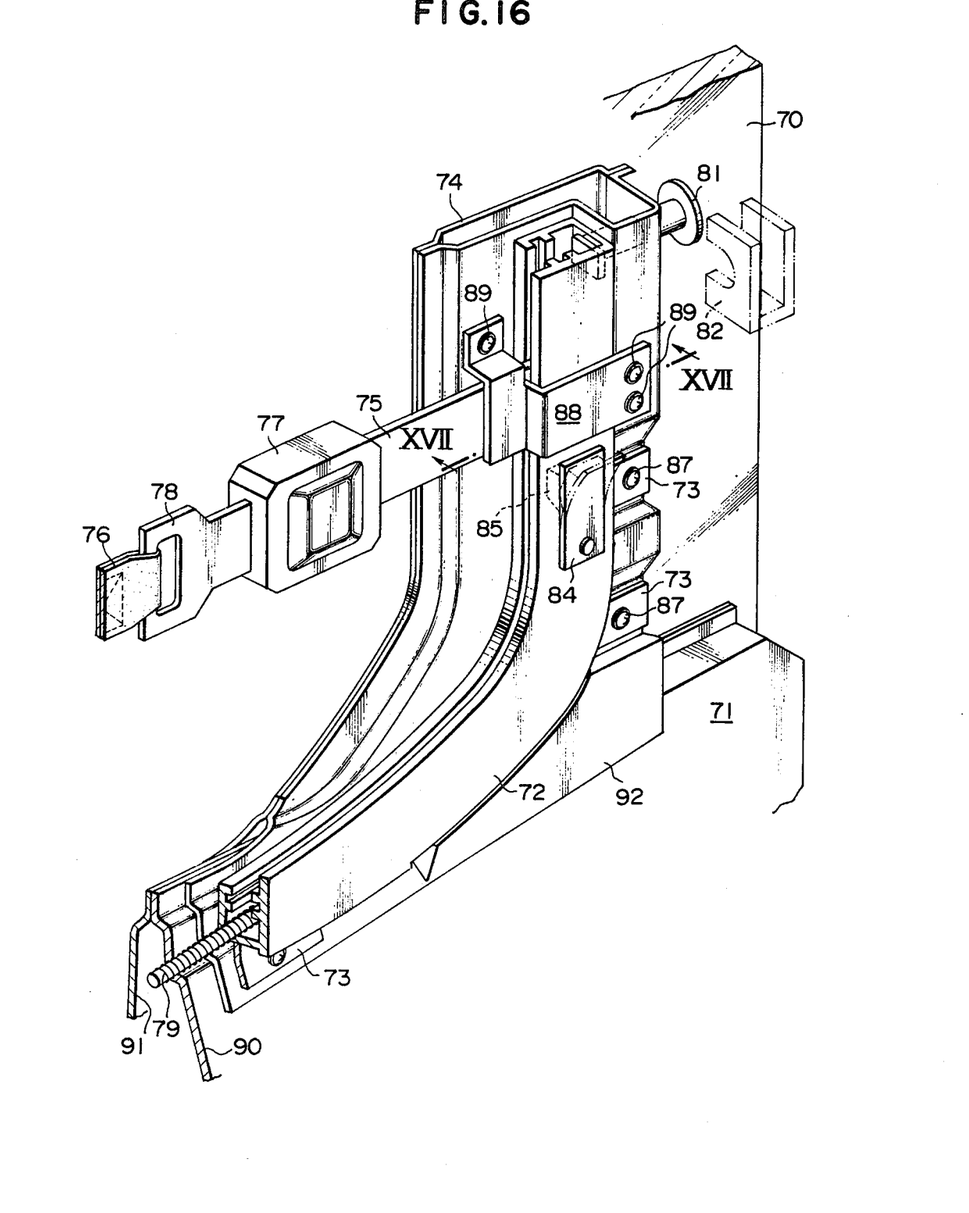
FIG. 16 is an enlarged perspective view of a tower part of FIG. 15.

As shown in FIG. 16, the guide rail 72 is mounted to the door panel 71 and the tower 74 at the mount pieces 73 by bolts 87. The upper end portion of the guide rail 72 is held by a reinforcing member 88 which is mounted to the tower 74 by using bolts 89. Numerals 90 and 91 denote a door inner panel and a reinforcing panel, respectively, in the same manner as panels 54 and 55 of the first embodiment shown in FIG. 11. An inner tower member 92 of the tower 74 is mounted to the door inner panel 90.

Figure 18:
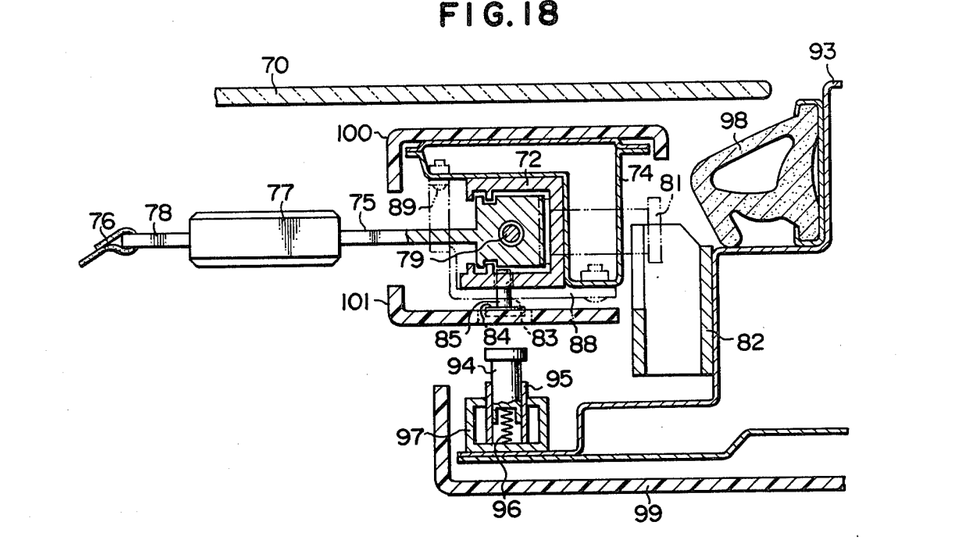
FIGS. 18 and 19 are enlarged transverse cross sections for explaining a locking mechanism of locking means of the passive seat belt of FIG. 15.
Figure 19:
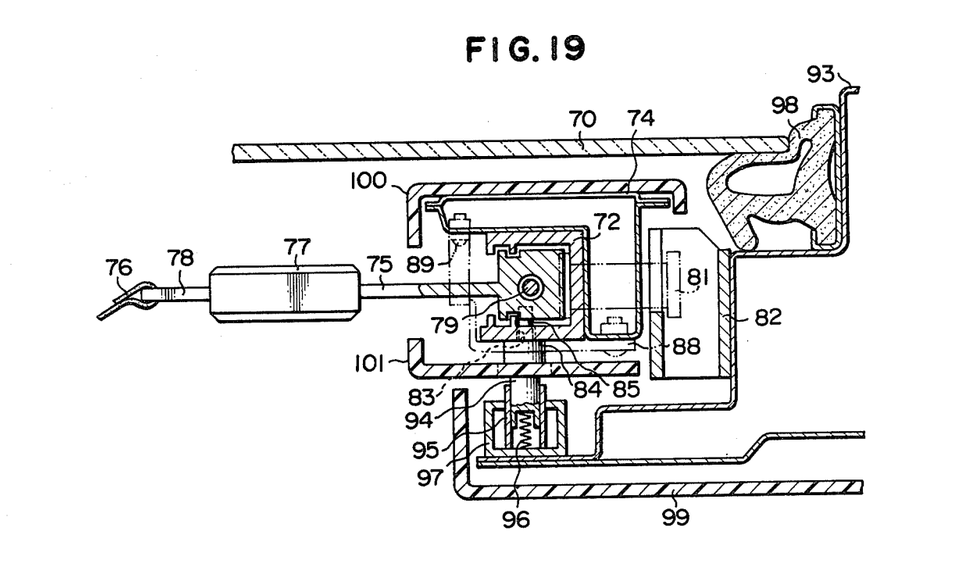

As shown in FIGS. 18 and 19, a push member 94 for pushing the flexible member 84 is fitted in a cylindrical member 95 which is mounted horizontally to the pillar 93 via guide member 97. The push member 94 is biased outwards by a coil spring 96 positioned in the cylindrical member 95. A weather strip 98 is attached to the outer front corner portion of the pillar 93. The rear end of the door window glass 70 is adapted to contact with the weather strip 98 when the door B is closed. The inner surface of the pillar 93 is covered by a trim member 99. The outer surface of the tower 74 and the inner side of the guide rail 72 are preferably covered by surface covers 100 and 101.

As shown in FIG. 18, when the door B is open, the flexible member 84 is not pushed by the push member 94, and thus the stop piece 85 is not inserted in the groove 72a of the guide rail 72. Hence, the movable anchor 75 can be freely moved in the guide rail 72 and can not be locked by the stop piece 85.

As shown in FIG. 19, when the door B is closed, the push member 94 biases the flexible member 84 so that the stop piece 85 may be projected into the groove 72a of the guide rail 72. In this condition, the movable anchor 75 can be moved up beyond the stop piece 85 projected in the groove 72a of the guide rail 72 by pushing the tapered surface of the stop piece 85 against the biasing force of the coil spring 96. As soon as the movable anchor 75 passed through the stop piece 85 to the upper end of the guide rail 72, i.e. the put-on position of the belt 76, the stop piece 85 is projected into the groove 72a of the guide rail 72, thereby locking the movable anchor 75 from moving downwards.

Then, when the door B is opened, the stop piece 85 comes out of the groove 72a of the guide rail 72 since the biasing force of the coil spring 96 is released from the flexible member 84, thereby releasing the locking between the movable anchor 75 and the stop piece 85, as shown in FIG. 18.

According to the present invention, a guide ring may be attached to the free end of the movable anchor 75, and the belt is connected by passing through the guide ring instead of mounting to the free end of the movable anchor 75 via belt anchor.

Figures 20, 21:
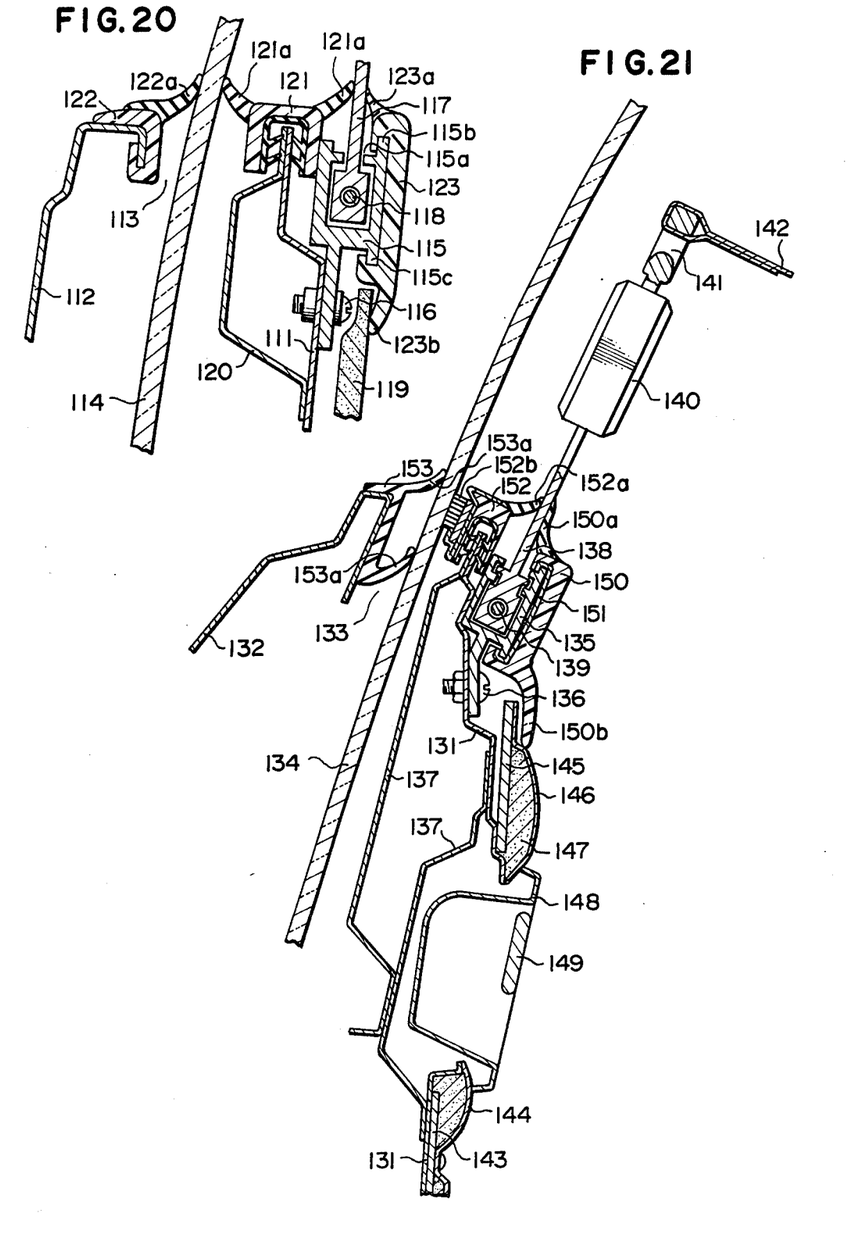
FIG. 20 is an enlarged fragmentary longitudinal cross section of a door to which a passive seat belt and a decorative trim piece attached thereto according to the present invention are mounted.
FIG. 21 is an enlarged fragmentary longitudinal cross section of another passive seat belt according to the present invention, to which a decorative trim place is attached.

FIG. 20 is an enlarged fragmentary longitudinal cross section of a door to which a guide rail of a passive seat belt according to the present invention is mounted.

A door panel comprises a door inner panel 111 and a door outer panel 112. A door window glass 114 is arranged in a space 113 between the door inner panel 111 and the door outer panel 112. A guide rail 115 having a groove 115a in its upside, and upper and lower flanges 115b and 115c in its inner upper and lower end portions is mounted to the door inner panel 111 by a bolt 116. A movable anchor 117 is adapted to move in the groove 115a of the guide rail 115 via a geared wire 118, in the same manner as described above.

A door trim 119 is mounted to the door inner panel 111 via a bracket (not shown), and the upper end of the door trim 119 extends near the lower end of the guide rail 115. A reinforcing panel 120 is attached to the door inner panel 111 outside thereof.

A welt 121 having fillets 121a in its both sides is fitted on the connected upper ends of the door inner panel 111 and the reinforcing panel 120, the fillets 121a covering the openings between the guide rail 115 and the movable anchor 117 and between the door window glass 114 and the reinforcing panel 120. A weather strip 122 having a fillet 122a in its inside is attached to the upper end of the door outer panel 112, the fillet 122a covering the opening between the door window glass 114 and the door outer panel 112. A decorative trim piece 123 having a fillet 123a in its upper end and a lower end cover 123b in its lower end is fitted on the flanges 115b and 115c of the guide rail 115, the fillet 123a covering the opening between the guide rail 115 and the movable anchor 117, and the lower end cover 123b covering the upper end of the door trim 119 in contact therewith.

In FIG. 21 there is shown another embodiment of a door and a passive seat belt according to the present invention, attached thereto, alike FIG. 20.

A door panel comprises a door inner panel 131 and a door outer panel 132. A door window glass 134 is disposed in a space 133 between the door inner panel 131 and the door outer panel 132. A guide rail 135 having a groove in its upside, and upper and lower flanges in its inner upper and lower end portions is mounted to the door inner panel 131 by a bolt 136, in the same manner as the embodiment of FIG. 20. Reinforcing panels 137 are fixed to the door inner panel 131.

A movable anchor 138 is adapted to move in the groove of the guide rail 135 through a geared wire 139. A belt 142 is connected to the free end of the movable anchor 138 via an emergency buckle 140 and a belt anchor 141.

An inner board 143 is mounted to a lower door inner panel 131 by a bolt, and is covered by a surface cover 144. A door trim 145 is mounted to the door inner panel 131, and its surface is covered by a surface cover 146 and a pad 147 inserted therebetween. A concave inner panel 148 is mounted between the door inner panel 131 and the lower door inner panel 131, and a door inner handle 149 is mounted to the concave inner panel 148.

A decorative trim piece 150 having a fillet 150a in its upper end and a lower end cover 150b in its lower end is fitted on the flanges of the guide rail 135 via spring member 151, in the same manner as the embodiment of FIG. 20. A welt 152 having a fillet 152a in its inside and bristles 152b set in its outer side is fitted on the connected upper ends of the door inner panel 131 and the reinforcing panel 137, in a manner similar to the embodiment of FIG. 20. A weather strip 153 having fillets 153a in its inside is attached to the upper end of the door outer panel 132, in the same manner as the embodiment of FIG. 20.

Figure 22:
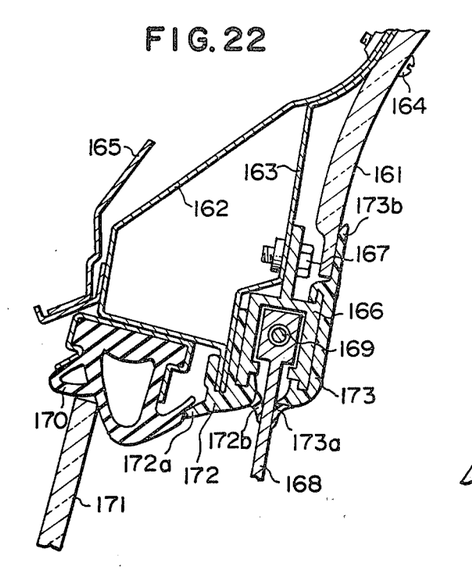
FIG. 22 is an enlarged fragmentary longitudinal cross section of a guide rail and a decorative trim place attached thereto of a further passive seat belt according to the present invention, which is mounted to a roof side rail.

In FIG. 22 there is shown a further passive seat belt of the present invention, mounted to a roof side rail.

A head lining 161 is mounted to a roof side rail comprising outer roof side rail 162 and inner roof side rail 163, by a bolt 164. The roof side rail is covered by a roof panel 165. A guide rail 166 having a groove opening at its bottom and upper and lower flanges in its inner upper and lower end portions is mounted to the inner roof side rail 163 by a bolt 167. A movable anchor 168 whose free end extends downwards is adapted to move in the groove of the guide rail 166 via a geared wire 169 in the same manner as the embodiments described above.

A weather strip 170 is fixed to the lower end of the roof side rail, the upper end of a door window glass 171 is contacted with the weather strip 170 when the door is closed. A welt 172 having fillets 172a and 172b in its outer and inner sides is attached to the lower end of the inner roof side panel 163, the outer fillet 172a contacting with the inner side end portion of the weather strip 170, and the inner fillet 172b covering the opening between the guide rail 166 and the movable anchor 168. A decorative trim piece 173 having a fillet 173a in its lower end and an upper end cover 173b in its upper end is fitted on the flanges of the guide rail 166, the fillet 173a covering the opening between the guide rail 166 and the movable anchor 168, and the upper end cover 173b covering the lower end of the head lining 161 in contact therewith.

Figure 23:
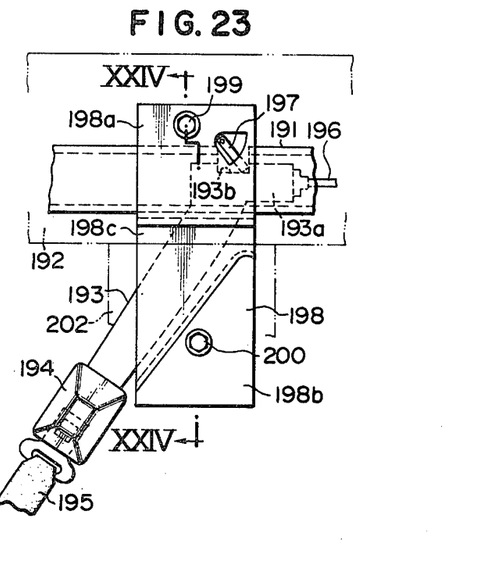
FIG. 23 is an enlarged side view of the essential part of a passive seat belt according to the present invention, to which a reinforcing member is attached.
Figure 24:
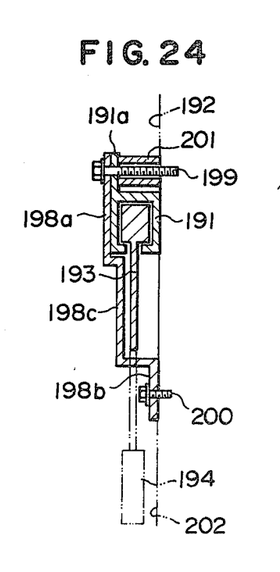
FIG. 24 is a longitudinal cross section, taken along the line XXIV—XXIV of FIG. 23.

In FIGS. 23 and 24 there are shown a guide rail 191 mounted to a roof side rail 192, and a movable anchor 193 which is adapted to move in the groove of the guide rail 191. The free end of the movable anchor 193 is connected to a belt 195 via an emergency buckle 194. The other end of the belt 195 is rolled up by a retractor (not shown) positioned on a floor of an automobile. A geared wire 196 is connected to a runner 193a of the movable anchor 193, which moves in the groove of the guide rail 191. The geared wire 196 is moved by a motor (not shown) in the same manner as described above.

A locking pin 197 is pivotally mounted to the guide rail 191, and is adapted to engage with a groove 193b formed in the upper end of the runner 193a of the movable anchor 193 so as to lock the movable anchor 193 from moving. The lock of the movable anchor by the locking pin 197 is released by pivoting the locking pin 197 to the unlock position by a switch (not shown) when the belt 195 is released.

A reinforcing member 198 comprises an upper mounting part 198a, a lower mounting part 198b, and a movable anchor holding part 198c. The upper mounting part 198a is mounted to the roof side rail 192 by a bolt 199 and a spacer collar 201 which the bolt passes through, while it holds the guide rail 191, and the lower mounting part 198b is mounted to a pillar 202 of the body of the automobile by a bolt 200. In this embodiment, the movable anchor holding part 198c is open to front and rear end so that the movable anchor 193 may be passed through it. Although the movable anchor holding part 198c of the reinforcing member 198 has a triangular form which conforms to the shape of the movable anchor 193, however, this form can be changed as occasion demands.

Figure 25:
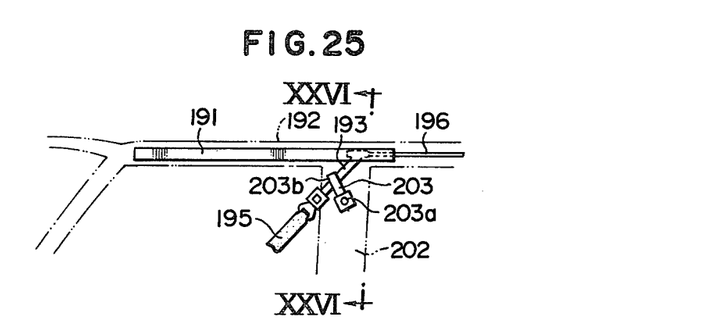
FIG. 25 is a side view of the essential part of a passive seat belt according to the present invention, to which another reinforcing member is attached.
Figure 26:
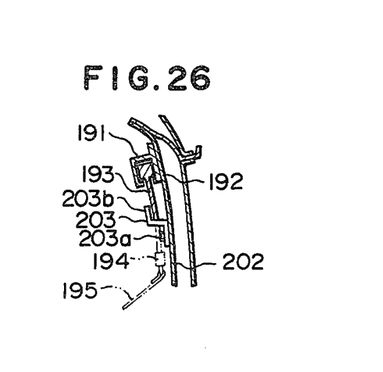
FIG. 26 is a longitudinal cross section, taken along the line XXVI—XXVI of FIG. 25.

In FIGS. 25 and 26 there is shown another reinforcing member 203 for the movable anchor 193, comprising a lower mounting part 203a which is mounted to the pillar 202 by a bolt, and an upper opening part 203b through which the movable anchor 193 passes, for holding the movable anchor 193. The other members are the same as those of the embodiment of FIGS. 23 and 24.

The reinforcing member can be applied to the guide rail which is mounted to the door panel in the same manner as described above.

Although the present invention has been described in terms of preferred embodiments thereof, however, it will be apparent that various changes and modifications can be made by those skilled in the art without departing from the scope of the present invention.

What is claimed is:

1. A passive seat belt system for a vehicle comprising:
   (a) a horizontally extending guide rail for being located on the upper end of a panel of a door of a vehicle, the guide rail having a rear end;
   (b) a vertical member having a locking hole defined therein and having a top portion, the vertical member being movable along the guide rail in an upright position, top portion upward;
   (c) drive means for being disposed in the door panel and operable for driving the vertical member along the guide rail toward the rear end thereof,
   (d) a belt for extending across a seat disposed near the door, the belt having a first end capable of being mounted to the top portion of the vertical member and having a second end opposite the first end for being connected on a side of the seat opposite the door; and
   (e) locking means for locking the vertical member at the rear end of the guide rail, the locking means comprising:
      (1) a locking member for being mounted near the rear end of the guide rail, the locking member having a movable free end, the free end of the locking member being movable in a locking direction toward the vertical member and in an unlocking direction generally opposite the locking direction; and
      (2) biasing means for pushing the free end of the locking member in the locking direction; the vertical member engaging the free end as the drive means drives the vertical member toward the rear end of the guide rail, the vertical member pushing the free end in the unlocking direction until the biasing means pushes the free end in the locking direction into the locking hole, thereby locking the vertical member.

2. The seat belt system of claim 1, wherein the locking means is for mounting to a body portion of the vehicle.

3. The seat belt system of claim 1, wherein the locking means is for mounting to the door of the vehicle.

4. The seat belt system of claim 1, wherein the guide rail and the vertical member define an opening therebetween, the guide rail having an inner side for being disposed toward the seat of the vehicle, the system further comprising:
   a trim member for mounting on the door panel near the guide rail, the trim member having an end portion; and
   a cover member on the inner side of the guide rail for covering the guide rail, the end portion of the trim member, and the opening between the guide rail and the vertical member.

5. The seat belt system of claim 4, wherein the cover member has a fillet for covering the opening between the guide trail and the vertical member and an end cover for covering the end portion of the trim member.

6. The seat belt system of claim 1, further comprising a retractor for being located on the side of the seat opposite the door, the second end of the belt being retractably connected to the retractor, the guide rail having a groove defined therein, the vertical member being movably positioned in the groove, the retractor being operable for retracting the belt and for thereby pulling the vertical member in an inward direction when the first end of the belt is mounted to the vertical member, the system further comprising a reinforcing member near the rear end of the guide rail for holding the vertical member and for preventing it from bending in the inward direction, the reinforcing member defining an opening therein, the vertical member extending through the opening when the vertical member is at the rear end of the guide rail.

7. The seat belt system of claim 1, further comprising an upright tower member for being mounted at the rear end of the guide rail for receiving the vertical member.

8. A passive seat belt system, comprising:
(a) an upright tower member for being located on the rear top end of a panel of a door of a vehicle;
(b) a guide rail for being located on the top end of the door panel, the guide rail having a groove defined therein and having a forward end for extending along the top end of the door panel and a rear end for extending along the tower member; the groove opening in an upward direction along the forward end and opening in a forward direction along the rear end;
(c) a movable member having a foot end for being slidably positioned in the groove of the guide rail and slidable for moving the movable member along the guide rail, the movable member further having a free end opposite the foot end, the free end extending in the forward direction from the groove when the foot end is in the rear end of the guide rail and in the upward direction from the groove when the foot end is in the forward end of the guide rail;
(d) drive means for being disposed in the door panel and operable for driving the movable member along the guide rail toward the rear end thereof when the door is closed;
(e) a belt for extending across a seat disposed near the door, the belt having a first end capable of being mounted to the free end of the movable member and a second end opposite the first end for being connected on a side of the seat opposite the door; and
(f) locking means for locking the movable member at the rear end of the guide rail, the locking means comprising:
(1) a locking member for being mounted near the rear end of the guide rail, the locking member having a free end, the free end of the locking member being movable in a locking direction into the groove in the guide rail and an unlocking direction out of the groove;
(2) first biasing means for pushing the free end of the locking member in the unlocking direction;
(3) a pushing member positioned for pushing the free end of the locking member in the locking direction into the groove when the door is closed; and
(4) second biasing means for pushing the free end of the pushing member in the locking direction for overcoming the first biasing means; the foot end of the movable member engaging the free end of the locking member when the drive means drives the movable member toward the rear end of the guide rail when the door is closed, the foot end pushing the free end in the unlocking direction until the second biasing means pushes the pushing member in the locking direction, pushing the free end of the locking member into the groove, thereby locking the movable member.

9. The seat belt system of claim 8, wherein the locking means is for mounting to a body portion of the vehicle.

10. The seat belt system of claim 8, wherein the locking means is for mounting to the door of the vehicle.

11. The seat belt system of claim 8, wherein the guide rail and the movable member define an opening therebetween, the guide rail having an inner side for being disposed toward the seat of the vehicle, the system further comprising:
a trim member for mounting on the door panel near the guide rail, the trim member having an end portion; and
a cover member on the inner side of the guide rail for covering the guide rail, the end portion of the trim member, and the opening between the guide rail and the movable member.

12. The seat belt system of claim 11, wherein the cover member has a fillet for covering the opening between the guide rail and the movable member and an end cover for covering the end portion of the trim member.

13. The seat belt system of claim 8, further comprising a retractor for being located on the side of the seat opposite the door, the second end of the belt being retractably connected to the retractor, the guide rail having a groove defined therein, the movable member being movably positioned in the groove, the retractor being operable for retracting the belt and for thereby pulling the movable member in an inward direction when the first end of the belt is mounted to the movable member, the system further comprising a reinforcing member near the rear end of the guide rail for holding the movable member and for preventing it from bending in the inward direction, the reinforcing member defining an opening therein, the movable member extending through the opening when the movable member is at the rear end of the guide rail.

14. A passive seat belt system for a vehicle, comprising:
(a) a guide rail for being located on an upper part of a panel of a door of a vehicle; the guide rail for being extended from a rear end disposed toward a rear side of the door to a front end disposed toward a front side of the door opposite the rear side thereof;
(b) a movable member movable along the guide rail and having a free end disposed away from the guide rail, the free end being at a substantially fixed height above the panel as the movable member moves along the guide rail;
(c) a belt for extending across a seat disposed near the door, the belt having a first end capable of being mounted to the free end of the movable member and a second end opposite the first end for being connected on a side of the seat opposite the door; and
(d) drive means for being disposed in the door panel and operable for driving the movable member along the guide rail for positioning the belt in relation to a person on the seat.

15. The seat belt system of claim 14 in which the guide rail is capable of extending horizontally along the upper part of the door panel, the movable member being vertically upright when it moves along the horizontally extending guide rail.

16. The seat belt system of claim 15, further comprising an upright tower member at the rear end of the guide rail for receiving the vertically upright movable member.

17. The seat belt system of claim 14, further comprising an upright tower member at the rear end of the guide rail, the guide rail for being extended generally upward along the tower member at its rear end and generally horizontally along the upper part of the door panel at its forward end.

18. The seat belt system of claim 17 in which the tower member comprises a reinforcing member for receiving the movable member.

* * * * *